United States Patent Office 3,182,181
Patented May 4, 1965

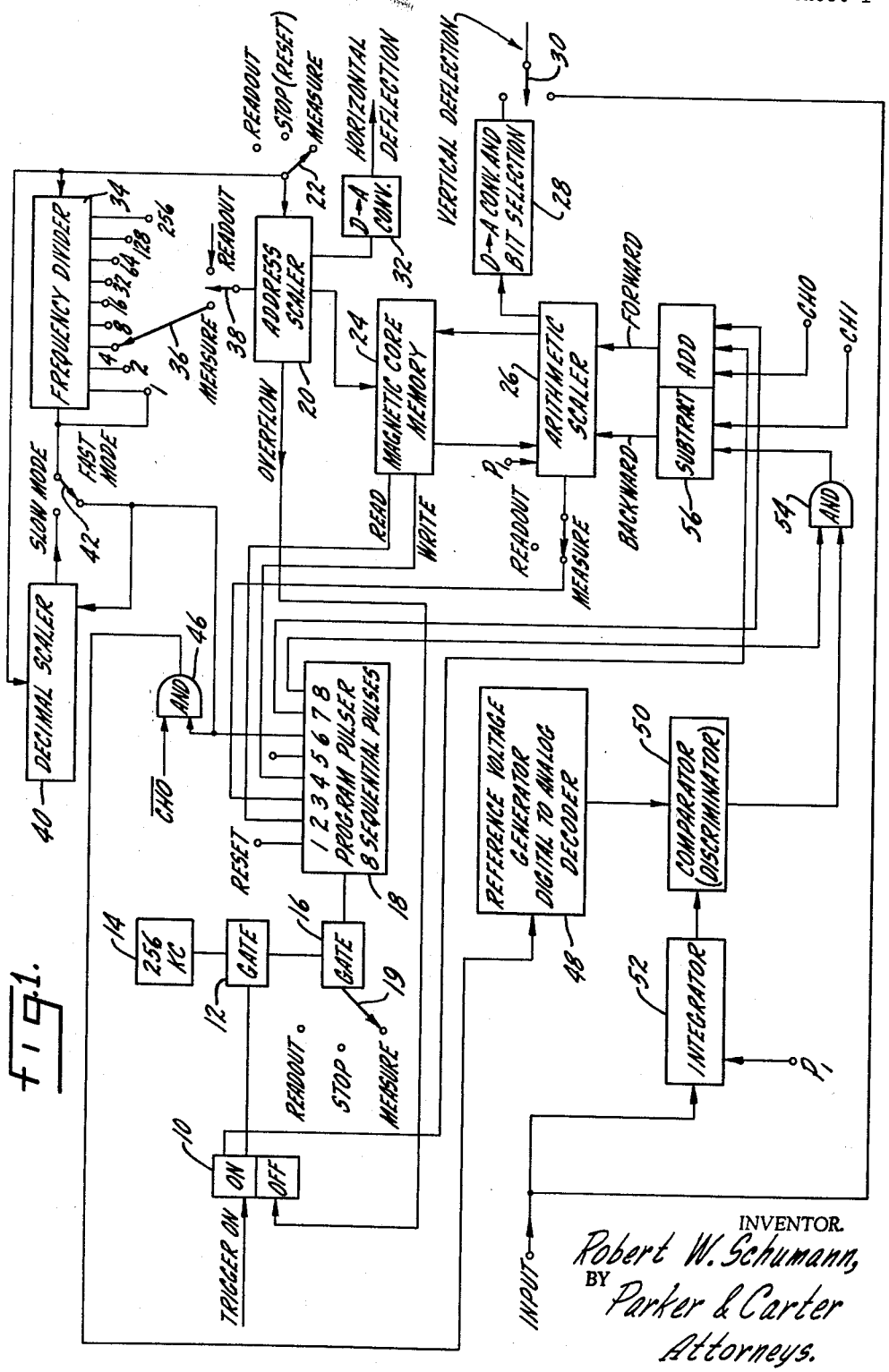

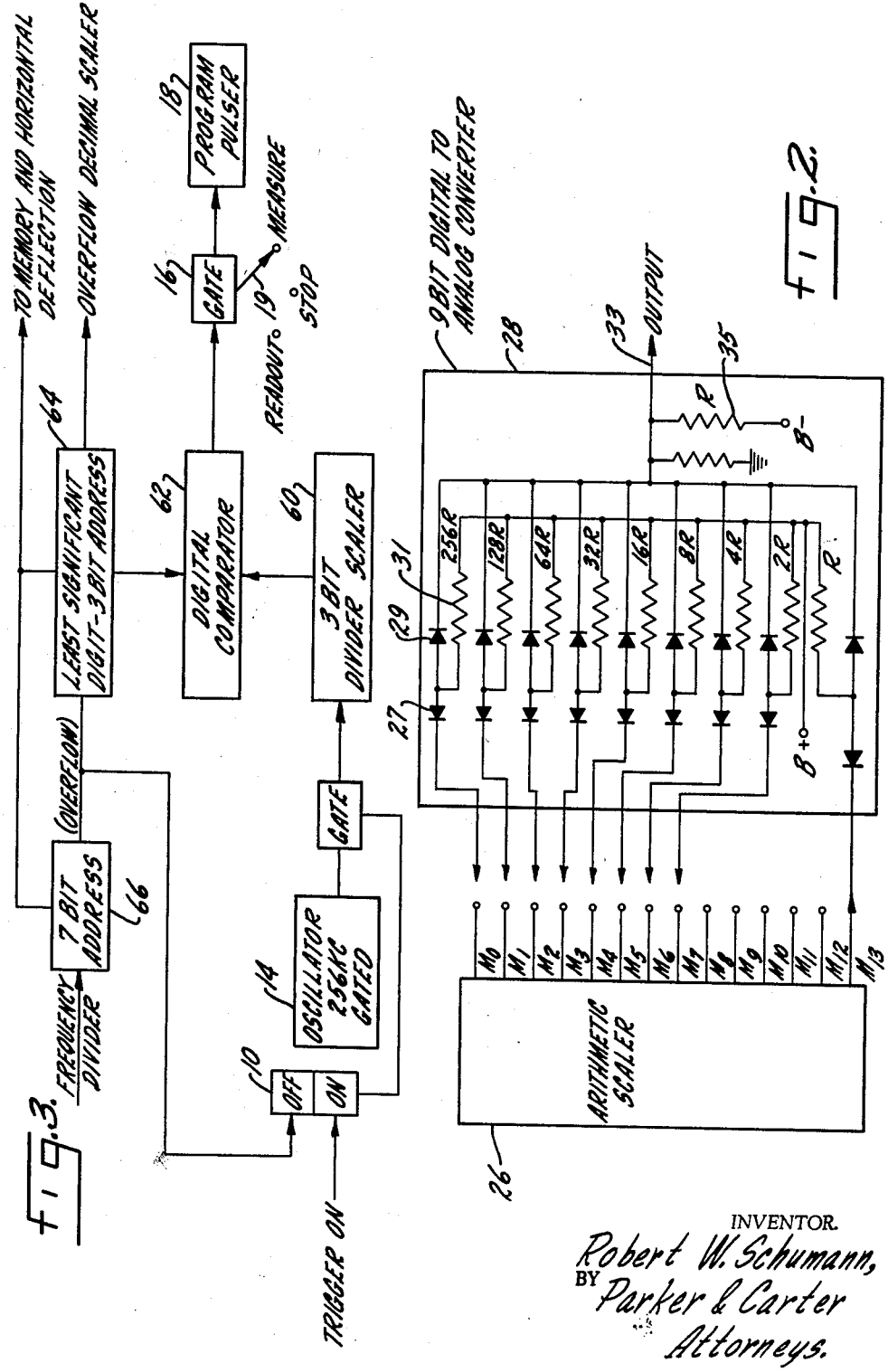

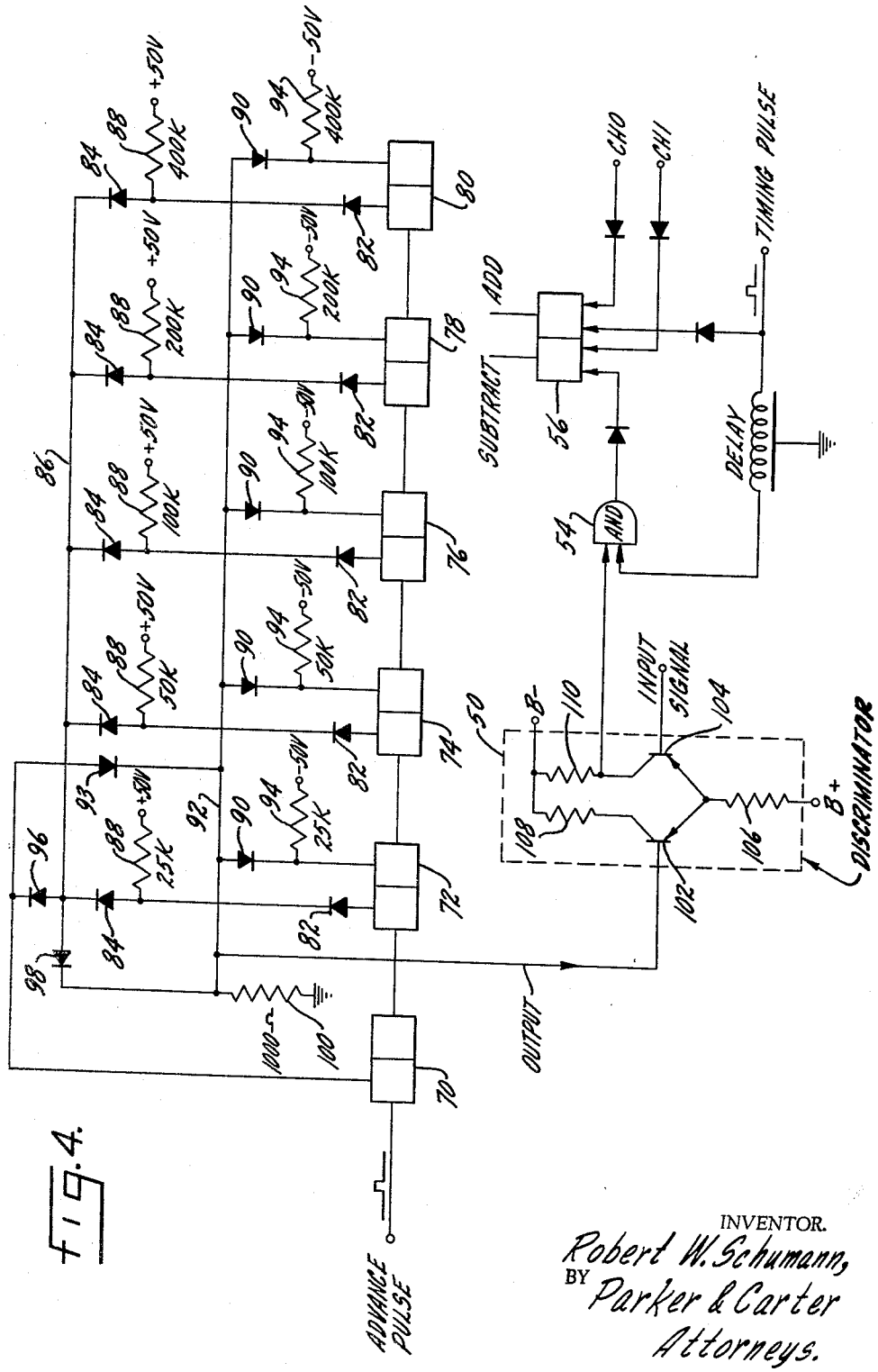

3,182,181
METHOD AND APPARATUS FOR AVERAGING A SERIES OF ELECTRICAL TRANSIENTS
Robert W. Schumann, Madison, Wis., assignor to Nuclear Data, Inc., Madison, Wis., a corporation of Illinois
Filed July 9, 1963, Ser. No. 293,692
36 Claims. (Cl. 235—164)

This invention relates to a method and apparatus for averaging a succession of electrical transients at corresponding time intervals, and is a continuation-in-part of my co-pending application Serial No. 268,285, filed March 27, 1963.

The invention has application in averaging electrical transients which are components of a signal which may have substantial noise. The invention should not be limited in application to noisy signals as it is perfectly satisfactory with signals which are free from noise. An example of the application of the invention is in biological studies wherein responses of the brain to certain stimuli are to be averaged. Also, the invention has application in the radar field in which it is necessary to determine the true echo in a heavy noise background. The invention is useful in the aircraft industry in analyzing the vibrations of various parts of the aircraft structure caused by repeated shocks to the structure. In general, it may be stated that the invention has application wherever it is desirable to find the average waveform of a series of electrical transients.

A primary purpose of the invention is a method and apparatus of the type described for rapidly and accurately averaging the amplitudes of recurring electrical transients.

Another purpose is a method and apparatus of the type described including an improved high speed system for digitizing the amplitudes of electrical transients.

Another purpose is a method and apparatus of the type described which will accept and display electrical transients having both positive and negative components.

Another purpose is a method and apparatus of the type described which is adapted to average transients of widely varying time duration.

Another purpose is a method and apparatus of the type described in which there is a minimum period during which the computer is insensitive to the input signal.

Another purpose is a method and apparatus of the type described including an arrangement for indicating the number of successive signals which have been averaged, as well as miximum and minimum reference points for the signals.

Another purpose is a method and apparatus of the type described utilizing an averaging or integrator circuit with a fixed time constant, but which is adapted for analyzing transients of widely varying speed and time duration.

Another purpose is a method and apparatus of the type described including means for displaying the results with a proper base line or reference.

Another purpose is a computer of the type described in which the accumulating count in each memory channel is only changed by one for each transient.

Other purposes will appear in the ensuing specification, drawings and claims.

The invention is illustrated diagrammatically in the following drawings wherein:

FIGURE 1 is a block diagram illustrating the overall system,

FIGURE 2 is an electrical diagram illustrating the digital-to-analog converter and bit selection unit at the output of the system shown in FIGURE 1, FIGURE 3 is a block diagram of a portion of a system utilized for averaging transients which are of very short time duration, and FIGURE 4 is a schematic diagram of a circuit suitable for generating a reference voltage.

One presently utilized method for finding the average value of recurring electrical transients is to divide each transient into time segments, or "channels," and to feed the amplitude of the transient in each segment to a multichannel scaler. The transient in each time interval may be converted to a voltage form and the voltage may then be converted to a frequency form with the frequency being proportional to the amplitude of the signal. Using a multichannel scaler, the number of frequency modulated pulses occurring in each time interval or "channel" is counted and that number is recorded in a memory in one counting channel. The memory address is advanced and the number of pulses in the next time segment is counted. There will be a number or count corresponding to the amplitude of this signal in each time segment. The number of recurring signals that are utilized will depend upon the variations in the transient as it is necessary to arrive at an ultimate average for each channel in order to get a true indication of the overall average wave form. U.S. Patent 3,087,487 discloses a method and apparatus of this type. The method disclosed in this patent has inherent speed limitations in that there is a considerable amount of "dead" time. The memory register cannot be used for counting during the time it is being used to control the memory. This means that for a given time segment, the time available for counting is less than the time segment by the period required to read into and out of the memory. Unless the time segments are very long, a large number of transients must be utilized to arrive at statistically accurate data. Also, there will be rapid accumulation of counts in the memory during quiescence or zero signal if both positive and negative values of the input are to be recognized, since zero signal must usually be represented by a "center frequency" typically midway between zero frequency and maximum frequency.

A second method is described in an article entitled "Average Response Computer" (ARC-1) written by W. A. Clark, Jr., of the Lincoln Laboratory at M.I.T. This article, which was published in a 1958 Quarterly Progress Report, Research Laboratory for Electronics, M.I.T., describes a computer in which successive signal transients are divided into uniform time intervals. An analog-to-digital converter samples and quantizes the signal wave form at each of the uniform time intervals. An eight-bit binary number is used to digitize the amplitude of the signal during each time interval. The amplitude during each time interval is then added to accumulating 18-bit sums which are in the memory. After a certain number of successive transients, the accumulating numbers in the memory will be an indication of the average of the transients for each of the intervals. This particular type of computer utilizes an 18-bit memory and a full adder system. It is quite expensive and is not capable of high speeds.

Of basic importance in the present invention is the digitizing process or the process for determining the average of a series of signals. Consider the case in which the average voltage existing upon an input terminal over a period of time is to be determined. In this invention, this voltage is compared with another voltage called a reference voltage, or a round-off voltage. The comparison is made numerous times during the measurement, and a different reference voltage is used for each comparison. If the reference voltage assumes values according to certain rules, then after a sufficient number of comparisons and reference voltage changes have been made, the average input signal voltage will be indicated accurately by the sum of the total number of times that the signal voltage exceeded the reference voltage at the time of comparison, minus the total number of times that the reference voltage at the time of comparison exceeded the signal voltage.

In general, it is preferred that the reference voltages be uniformly distributed over the expected range of the signal of interest and that the average of the reference voltages be midway between the maximum and minimum reference voltages. If there are both positive and negative reference voltages, then the average reference voltage should be zero. If the signal of interest is always positive, or is always negative, then the average of the reference voltages will be a predetermined value, either above or below zero, and the value of the average will have to be taken into consideration in computing the average of the signals of interest. In some applications, the reference voltages may not be uniformly distributed over the expected range of the signal of interest. For example, there may be a non-linear distribution of reference voltages, such as a sine wave.

Assuming an application in which the reference voltages will vary between +1 unit and −1 unit and will be distributed in equal increments, and a constant signal voltage, for example zero, the number of times the signal voltage will exceed the reference voltage will be the same as the number of times that the reference voltage exceeds the signal voltage. The sum of the comparisons will be zero, which is the value of the signal voltage. On the other hand, if the signal voltage is just slightly greater than the largest reference voltage magnitude, the accumulated sum will be equal to the total number of comparisons, since the signal will always have been greater than the reference voltage. If the signal voltage is one-half the value of the largest reference voltage, then one-fourth of the comparisons will result in a negative indication, while three-fourths of the time the signal voltage will have been greater than the reference voltage. The total of the negative plus positive comparisons will be exactly one-half the sum when the signal was twice as large. Whatever the input signal, the total of positive and negative comparisons will be proportional to the magnitude of that input signal, with only negligible error.

If the input signal is a varying signal, the sum obtained by this method will accurately represent the average signal magnitude after a sufficient number of comparisons are made, providing only that there is no relationship between the signal variations and the deliberate variations made in the reference voltage. Consider that the input signal is composed of two components, one a fixed component precisely equal to the true average value of the signal during the measurement period, and the other a variable component which has an average value of exactly zero. One component of the sum of comparisons is due to the fixed signal component, and it will be proportional to the magnitude of the fixed signal component. The other component of the sum will be due to the variable portion of the signal, and inasmuch as it has an average value of zero, as does the reference voltage, it will be entirely as likely to exceed the reference voltage during a given comparison as to be less than that reference. Hence the component of the final numerical sum due to the variable portion of the signal will be zero. The complete total will therefore be proportional to the average value of the signal.

In most applications to be made of this invention, the variable component of the signal is random noise, so there is no relationship between the variations in the reference voltage and the variations in the signal voltage. Care is taken to avoid any possible relationship between the reference voltage variations and the signal variations, inasmuch as in some circumstances the "noise" included with the signal is periodic in nature, and not truly random.

In general there will be a predetermined number of reference voltages. After each of these values has been utilized, the sequence will be repeated. It has been determined that the spacing between adjacent values of reference voltages need not be any closer than the overall degree of precision required in the measurement. If the signal voltage range is from plus one volt to minus one volt, for example, and if it is desired to know the final numerical average to an accuracy corresponding to one-tenth of one volt, then one-tenth of one volt spacing between adjacent reference voltages is sufficient. Twenty discreet levels would be sufficient in such a case. It has furthermore been determined that if the noise included with the signal has an average magnitude of X volts, the reference voltage magnitude differences can be as large as an appreciable fraction of X volts, and the results will be precise even if, under these conditions, very few reference voltage levels are used.

The number of different reference voltages employed depends upon the application. If no noise is expected, and one percent precision is required, it is necessary to provide one hundred positive and one hundred negative reference voltage levels, equally spaced. In the embodiment described herein, thirty-one positive and thirty-one negative levels are provided. This is a reasonable number for general application, as usually there is substantial noise, far exceeding one thirty-second of full scale signal voltage.

The sequencing of the reference voltages is important. A preferred sequence is to generate reference voltages which are alternately positive and negative, and which are effectively "scattered" in absolute magnitude, in contrast to a sequence which is sequentially increasing in absolute magnitude. The basic rule, that in the complete set of reference voltages, the magnitudes be uniformly distributed throughout the range, is not violated by the "scattering" process, for ultimately each possible value occurs one time in the sequence, before the sequence repeats. It is important that a particular value of reference voltage not be repeated more often than any other value, with the exception of the value zero. However, a rarely occurring accidental application of the same voltage more than once during one series does not create a problem. If the average magnitude of the reference voltages is some value other than zero, this merely produces a fixed error in the result, equivalent to the displacement of the average from zero. Such a fixed error can be easily corrected.

The reference voltages can be generated in several different ways. For example, the reference voltage could be a linearly and continuously increasing voltage such as a sawtooth waveform. It could be random noise. As shown herein, the reference voltage magnitudes are systematically controlled digitally, a method which is preferred as it is easier to avoid possible accidental relationships between the input signal changes and the changes in the reference voltage.

The present invention will divide each transient into a predetermined number of generally uniformly spaced time intervals. The transient will be averaged one or more times during each time interval, preferably by a conventional analog integrating circuit. The output from the integrating circuit, which may be a voltage level, will then be compared with the previously described reference voltage. The resultant of this comparison will be utilized to change the accumulating count in a memory channel, with the memory channel corresponding to the particular time interval. Each of the successive signals will be divided into corresponding time intervals and there will be a memory channel for each time interval.

In addition to dividing the signal into intervals, the intervals may themselves be subdivided into shorter periods of time. It is advantageous to have a fixed time constant for the integrator circuit and the length of the subintervals and whether or not they are used will be determined by the duration of the input signal.

FIGURE 1 illustrates an apparatus for practicing the method disclosed. A flip-flop 10, which may be a conventional transistorized multivibrator, is placed in the "on" condition by a suitable input trigger signal. This trigger signal may be initiated by the beginning of an electrical transient that is to be analyzed. When flip-flop 10 is placed in the "on" condition, gate 12 is opened to permit the output from an oscillator 14 to pass through a gate 16 to a program pulser 18. Gate 16 is opened when switch 19 is placed in the "measure" position. Oscillator 14 may be a 256 kc. oscillator as that is a convenient frequency, although the invention should not be limited to this particular frequency. The program pulser 18 will receive pulses from the oscillator 14 and each pulse from the oscillator will be effective to cause an output pulse on one of the terminals 1 through 8 of the program pulser. Although it may be otherwise, it is preferred that the first pulse from the oscillator 14 produce a pulse on wire number 1 of the program pulser, the second pulse from the oscillator produce an output pulse on wire number 2 and so forth. It is practical to have a single pulse from the oscillator 14 trigger a sequence of pulses from the program pulser, however, it is preferred that each pulse from the oscillator trigger a single pulse. The program pulser output pulses control the sequence of operation of the various components in the system.

A conventional address scaler 20, which may be placed in the measuring condition by a switch 22 is connected to a conventional magnetic core memory 24. The number of channels in the memory 24 and the number of addresses in the unit 20 will depend upon the number of time intervals into which the signals to be analyzed are divided. An arithmetic scaler 26 is connected to the memory and each time the count in the memory is to be changed, the particular sum already in a memory channel is read into the scaler. The count is then increased or decreased, depending upon the output of the comparator, as described hereinafter, and then the changed count is read back into the memory. A digital-to-analog converter 28 which includes bit selection, as described hereinafter, is connected to the output of the arithmetic scaler so that a voltage representative of the particular count in the scaler may be displayed on a conventional cathode ray tube. The output of the unit 28 may be connected through a switch 30 to the vertical deflection coils of the cathode ray tube. In the alternative, the vertical deflection coils may receive the input signal. The output of the address scaler 20 may be fed through a digital-to-analog converter 32 to the horizontal deflection coils of the cathode ray tube. The accumulated count in each channel of the memory will be indicated by a particular vertical deflection on the screen of the cathode ray tube. The various totals accumulated in the memory will form closely spaced points in a wave form shape on the cathode ray tube screen. This wave form, at any particular time, will be an indication of the average, at that time, of the input transients.

A frequency divider unit 34, which may be conventional, is arranged to divide the number of input pulses by any one of the numbers indicated. For example, as shown in FIGURE 1, switch 36 is on divide by four and there must be four input pulses into the frequency divider before there will be an output to the address scaler, assuming the address scaler switch 38 is in the "measure" position. A decimal scaler 40 may have an output connected through a switch 42 to the frequency divider 34. The decimal scaler acts as a divider which divides the frequency of address advance by a convenient amount such as 1000 so that the address advances in a certain number of milliseconds or seconds according to the position of slow mode-fast mode switch 42 and the setting of frequency divider switch 36. For the switch positions shown, the address advances once each 125 microseconds. If switch 42 is changed, the address advances once each 125 milliseconds.

The diagrammatic circuit arrangement of FIGURE 1 is completed by a reference voltage generator 48 which is connected to the output of gate 46 and whose output is connected to a comparator or discriminator 50. The comparator 50 also receives the output of an integrator 52 whose input is the signal being analyzed. The integrator circuit 52 provides an output which is the average of the input over a particular time interval. Such an average is more representative of the magnitude between the time boundaries than is a sampling of the instantaneous magnitude at the time boundary. The output of the comparator 50 is fed to an "and" gate 54 with the output of the "and" gate going to a flip-flop 56 which is connected to the arithmetic scaler 26.

The operation of the circuit in FIGURE 1 will now be described. Assume that switch 42 has been set to operate in the fast mode and switches 19, 22 and 38 have been set on the "measure" position. When flip-flop 10 is placed in the "on" condition by an input trigger signal, gate 12 is opened so that pulses from the oscillator 14 are fed to the program pulser. Also, flip-flop 56 is placed in the "add" condition. The first pulse from the output of the program pulser will be on wire 1 and this is a reset pulse which will reset the integrator 52 and the arithmetic scaler 26. The integrator 52 provides an average of the input transient during the period between reset pulses. Preferably, the integrator time constant is fixed, with other portions of the system being variable to provide flexibility. The output of the integrator, at the end of the period in question, will be the average value of the signal over the interval and it is this average value that will be utilized to change the count in the memory. Pulse 2 from the program pulser is fed to the memory 24 and causes the memory to read its accumulated count in channel zero, or the first channel, into the arithmetic scaler 26. Pulse 3 from the program pulser is fed to the arithmetic scaler and causes the count in the arithmetic scaler to either be increased by one or decreased by one, depending upon the condition of flip-flop 56. Because the system is in channel zero and this channel is a reference channel, flip-flop 56 is in the "add" condition due to the signal "CH0" applied to that flip-flop, and the arithmetic scaler will be advanced one count. At pulse 4, the output from the arithmetic scaler will be read back into the memory and the count in the memory for channel zero will have been increased by one.

At pulse 6 the frequency divider will be advanced one count. Because switch 36 is set on divide by four, the address scaler will not be advanced to the second channel, but will stay in channel zero. Pulse 6 is fed to "and" gate 46. However, because the address is in channel zero, a negative channel zero "not" signal is also fed to the "and" gate 46. This will keep "and" gate 46 closed and no advance pulse will be supplied to the reference voltage generator 48. At the next pulse, or pulse 7, flip-flop 56 will be reset to the "add" condition. At pulse 8 "and" gate 54 will be opened and the output of the comparator 50 will operate on flip-flop 56. The above sequence of steps will be repeated four times, as long as the frequency divider is set on divide by four. In each instance, however, the action of the signal CH0, which signifies that the address is in channel zero, will hold flip-flop 56 in the "add" condition despite possible signals from gate 54. Channel zero is a reference channel, always indicating the maximum possible positive value of the transient average and, regardless of the output of the comparator, a count will be added to the memory in channel zero, once each memory cycle.

After four counts have been added to the memory in channel zero, the address scaler will advance to channel one. Channel one may be another reference channel in this form of the invention, although it could be a different channel. The above sequence will be repeated for channel one. However, in this case, a count will be subtracted four times or the count in channel one will be decreased four counts due to the overriding action of the signal CH1 on flip-flop 56. The signal CH1 signifies that the address is at channel one. Note that the signal CH1 is fed to the subtract side of flip-flop 56. Channel one may be the negative reference channel and its accumulated count will indicate the maximum possible negative value of the transient averages. The reference channels are effective to indicate whether or not a displayed point is ambiguous. In this connection it may be advantageous to have a reference channel whose accumulated sum is always zero. The accumulating sum in the negative and positive reference channels can also be used to indicate the number of transients that have been analyzed.

It should be pointed out at this point that the memory 24 does not begin at zero count for any channel, but may begin at an intermediate count, for example a count of 8192 in a 14-bit memory. In this way a plus count will be greater than 8192 and a negative count will be less than 8192. Assuming that there are 14 bits in each channel of the binary memory 24, the memory will begin in a condition such that the most significant bit is one with all other bits being zero, for the binary number 8192 is 10000000000000. If the first count is an add count, then the least significant bit will be changed to one and the most significant bit will remain one. However, if the first count is a negative or subtract count, then immediately all of the bits will be changed to one except the most significant bit which will then become zero. The most significant bit is therefore a sign bit for the memory.

After channels zero and one, which may be the plus one and minus one reference channels, have their counts completed for the first transient or signal, the address scaler will advance to channel two. It is at this point that this signal, which is being integrated by the unit 52 will actually be measured. It should also be pointed out that the frequency divider is set so that the number of counts for each address are related to the time constant of the integrator. For example, assuming that the integrator has a time constant of 32 microseconds, and if the chanels into which the signal is to be divided have a width of 128 microseconds, then the frequency divider is set at divide by four. If each of the channels are longer, then the frequency divider will be set at appropriate higher divide numbers. Assume now that the memory is in channel two. During pulses two through seven from the program pulser the signal was being integrated. At pulse P8 the "and" gate 54 is operated. The output from the comparator 50 which combines the reference signal from the unit 48 and the signal from the integrator 52 will give an indication of whether or not the reference voltage or the integrator voltage is larger. Sign or polarity is taken into consideration. The reference voltage may vary between, for example, plus one and minus one unit, and the integrator voltage can be at any plus or minus value, as it can exceed one unit because of the noise component of the input signal. If the integrator voltage is greater than the reference voltage the "and" gate 54 will not be operated and flip-flop 56 will remain in the "add" condition. If, however, the output from the comparator indicates that the reference voltage is greater than the integrator voltage, "and" gate 54 will be operated and flip-flop 56 will be changed to the "subtract" condition. In the second integrating period of a particular channel the output of memory 24 will be read into the scaler at pulse P2. Assuming that this is the first signal to be analyzed, the count read into the arithmetic scaler 26 will be 8192, assuming that there is a 14-bit memory. If the integrator voltage was less than the reference voltage, the flip-flop 56 will have been placed in the subtract condition and a count will be subtracted from the count in the scaler 26. At pulse P4 this new count will be read into the memory for channel two. At pulse P6 the "and" gate 46 will be opened and this pulse will advance the reference voltage generator one step. The successive operations in channel two continue in the same manner until there have been four samples, again assuming switch 36 is set at divide by four. At the end of four samples, the address scaler will be advanced to channel three. This same sequence of operations will be repeated. It is important to note that in any channel but channel zero, the reference voltage generator will be advanced to a different reference voltage for each sampling. In this way, in any particular address there will eventually have been every possible value of round-off voltage, in the shortest possible time.

In the fast mode of operation the squence described above will continue until all addresses have been involved. Successive signals will be analyzed in the same manner. A different sequence of round-off voltages will be applied to corresponding channels in successive signals. This is brought about because when in channel zero, the reference voltage generator does not advance, whereas, in each of the other channels, the reference voltage generator will advance one step for each sampling.

During any signal occurrence, after the address scaler 20 has caused the count in each channel of the memory to be changed, the address will overflow and place flip-flop 10 in the "off" condition, indicating the end of a particular signal. Suitable circuitry also can be provided to place flip-flip 10 in an "off" condition whenever the count in any channel is ready to overflow. This will prevent the ambiguous results that would occur if the memory overflows.

The output of the address scaler may be fed through the digital-to-analog converter to the horizontal deflection coils of a cathode ray tube. The output of the arithmetic scaler may be fed through a digital-to-analog converter and bit selection as described hereinafter to the vertical deflection coils so that the average wave form after a number of signals may be displayed. It is also within the scope of the invention to provide digital readout. Normally there will be sufficient signals or transients analyzed so that a good sampling of different reference voltages will have been applied to each of the channels in the memory. The fast mode of operation is particularly useful where the signals are of sufficiently short duration or sufficiently fast so that a great number of signals may be analyzed in a small period of time. If the signals are of longer duration, then it is preferred to use the slow mode of operation.

In the slow mode of operation, the output of the decimal scaler is utilized to advance the frequency divider 34 and hence the address scaler 20. The decimal scaler may multiply the time of dwell in each channel one thousand-fold. Time calibrations which were expressed in milliseconds became seconds. The difference in operation between the slow mode and the fast mode is simply that the time scale is altered by this easily understood factor. If the frequency divider scaler 34 had merely been larger, the times would have become "odd" times such as 5.12 seconds per address change. Using a decimal scaler as a preliminary divider permits selection of $\frac{1}{32}$, $\frac{1}{16}$, $\frac{1}{8}$, $\frac{1}{4}$, $\frac{1}{2}$, 1, 2, 4 and 8 seconds per address change, which values are more convenient to the operator.

Gate 46 is effective to change the series of reference voltages that are applied to the same channel in successive transients. Consider the situation if gate 46 were not blocked by the signal CH0. Assume there are a total of 64 reference voltages generated by the reference voltage generator, each different except that the voltage zero occurs twice. Now if the address scaler is a binary scaler, such as a scale of 256 scaler, and if the address advances only once for every four alterations of the reference voltage, after sixteen address advances, all 64 reference voltages will have occurred. The sequence will repeat during the next sixteen addresses. It will have repeated sixteen times by the end of 256 address advances. Precisely the same series of reference voltages will be applied to the next transient and succeeding transients. The results from such an application of reference voltages would be inaccurate unless the input signal is embedded in very severe noise.

As shown herein, gate 46 is blocked by signal CH0 whenever the address is in channel zero or the first address. This provides a different series of reference voltages for the same address in successive transients. For example, let the sixty-four reference voltage levels be arbitrarily named level 1, 2, 3, . . . 64, without these numbers necessarily corresponding to the actual voltages. For the first signal, level 1 will exist during the four operations in address zero. Levels 2, 3, 4 and 5 will exist during the four operations in address one. Similarly, there will be four different reference voltages for each address, through address 15, after which the sequence will repeat. At the last address, address 255, levels 58, 59, 60 and 61 will occur. Then level 61 will remain during the four operations at address zero for the second signal. Levels 62, 63, 64 and 1 will occur in address one during the second signal. This is a different set than occurred during address one in the first signal. During the third signal levels 58, 59, 60 and 61 will occur in channel one. A different set of reference voltage levels will occur during each successive channel one, until the entire set of 64 levels will have occurred in that time interval after sixteen signal transients. Every sixteenth signal all 64 possible reference voltage levels will have occurred in every address.

FIGURE 2 illustrates the digital-to-analog converter and bit selection unit 28. Its function is to produce a deflection voltage for oscilloscope display or pen recording purposes, in which the number applied to the unit 28 is accurately reproduced in voltage magnitude form. Any positive number produces a positive deflection voltage output and any negative number produces a negative deflection voltage, where positive numbers are defined as numbers which have the fourteenth bit or most significant bit represented as a "1," and negative numbers as numbers which have the fourteenth bit or most significant bit represented as a "0." The amount of deflection is proportional to the absolute magnitude of the selected eight bits. In FIGURE 2 the consecutive selected bits are shown as the least significant eight bits of the number from the arithmetic scaler 26. If the numbers expected to be produced by the scaler 26 are large, eight consecutive bits of higher significance would be selected.

Each of the eight consecutive inputs to the bit selection unit 28 includes diodes 27 and 29 and a resistor 31 connected to their common anodes. The sign bit connection M13 also includes diodes 27 and 29 and resistor 31 connected in the same manner. All of the resistors 31 are connected in common to a positive voltage. The cathodes of diodes 29 are connected in common to the output 33 and through a resistor 35, having a value R, to a negative voltage. Resistors 31 are graduated in size from the value R for the sign bit selection, up through a value of 256R for the least significant selected bit. When the count is at zero the voltage developed across resistor 31 in the sign bit connection and the voltage developed across resistor 35 will be equal and will cancel each other out to provide zero output voltage at terminal 33. When any one of the eight consecutive inputs to the unit 28 has a voltage on it caused by a binary "1," the diode 29 associated with that input will conduct to effectively place its resistor 31 in parallel with the sign bit selection resistor 31 to vary the magnitude of the output voltage. The magnitude and sign of the output voltage is determined by the voltage on terminal M13 and the voltages on the selected consecutive eight terminals of the group M0–M12.

FIGURE 3 illustrates apparatus for operating the computer in still another mode of operation which may be designated the very fast mode. This mode is utilized for signals which are of a very short duration. These signals should be of such a nature that they can be repeated a large number of times to provide an acceptable average. Normally the signals will be of such short duration that it is not possible to change the accumulating count in the memory in the period of an integrating cycle.

The flip-flop 10, when put in the "on" condition by an external trigger is effective through gate 12 to apply the output of oscillator 14 to a three-bit divider scaler 60. The output from the divider scaler 60 is fed to a digital comparator 62. The other input to the digital comparator 62 is from a three-bit address scaler 64. The output from scaler 64 and from a seven-bit address scaler 66 is fed to the memory 24 and to the horizontal deflection coils, as in FIGURE 1. The overflow output from the seven-bit address scaler 66 is also fed to the three-bit address scaler 64, and to the flip-flop 10 to place it in the "off" condition. The scalers 64 and 66 together make up a ten-bit address, with scaler 66 having the most significant address digits and scaler 64 the least significant address digits.

The digital comparator 62 will feed an operating gate pulse to the gate 16 and hence to the program pulser 18 every eighth pulse from the oscillator 14. The program pulser will be effective to cause a sampling, integration and a change of the count in the memory, every eighth channel. For example, the first, ninth, seventeenth, etc., channels may be sampled during the first signal. The signal will be repeated a sufficient number of times, and this is possible because the signal is of short duration, so that each of the channels will be sampled and its accumulated count in the memory changed. The reference voltage may be the same until every channel has been sampled once, or it may vary as described above.

The number of channels that are skipped between channels that are sampled may vary and the arrangement of FIGURE 3 provides a sampling of every eighth channel. This is accomplished by splitting the address scaler 20 in FIGURE 1 into a most significant digit seven-bit address scaler and a least significant digit three-bit address scaler. The oscillator 14 will continually provide pulses to the three-bit scaler 60 which will overflow and repeat every eight pulses. Whenever the state of the address scaler 64 and the divider scaler 60 agree, the digital comparator will provide an output pulse to gate 16 and hence to the program pulser. Each time a channel is sampled, the address scaler 66 will be advanced. Because the scaler 66 has the most significant digits in the address, an advance will move the address forward eight channels. The next sampling will not occur for eight more pulses of the oscillator 14 because it is only then that the state of the divider scaler 60 and the address scaler 64 will again agree. When the address 66 overflows, that is, at the end of the first signal transient an advance pulse will be provided for address scaler 64 and its state will be changed. The state of scaler 60 and the state of address scaler 64 will then agree one channel later than before. Every time the address scaler 66 overflows the state of address scaler 64 is changed and hence its state will agree with the state of divider scaler 60 at the next channel in succession. After eight successive inputs, a sampling will have occurred in every channel. This entire process is then repeated.

The type of reference voltage and the sequence in which the reference voltages are applied may be varied as described above. FIGURE 4 shows one circuit for providing an acceptable and practical sequence of round-off voltages. A series of conventional binary stages or flip-flops are indicated at 70, 72, 74, 76, 78 and 80. The number of stages will vary depending upon the number of different round-off voltages which are to be applied. The arrangment shown in FIGURE 4 will provide 64 round-off voltages each different except that zero occurs twice. The left-hand side of binary stages 72 through 80 are each connected through diodes 82 and 84 to current node 86. A resistor 88 may be connected to the anode of each diode 84 and to a suitable positive voltage. The right-hand side of binary stages 72 through 80 are each connected through diodes 90 to current node 92. Resistors 94 each connect a negative voltage to the cathodes of diodes 90. Binary stage 70 is connected through a diode 96 to currrent node 86 and is connected through a diode 93 to current node 92. A further blocking diode 98 is connected between current node 86 and an output voltage developing resistor 100.

Suitable values for resistors 88 and 94 are shown in the drawings, although the value of these resistors may vary as what is important to provide incrementally varying currents. Resistors 88 and 94 may be doubled from one binary stage to the next. For example, the resistors connected to binary stage 72 may be 25K, the resistors connected to binary stage 74 may be 50K, those connected to binary stage 76 may be 100K and so forth. When each of the binary stages 72 to 80 is in a state so that the left-hand side is negative, no current will flow from that particular stage into both current nodes 86 and 92. The current flowing from the left-hand side will be designated a positive current and will flow into positive current node 86. The current flowing from the right-hand side will be designated negative current and will flow into negative current node 92.

Assuming that each of the binary stages 70 through 80 have been reset such that the left-hand sides are all negative, there will be zero output voltage developed across resistor 100 and hence no voltage will be supplied to the discriminator. The first advance pulse supplied to stage 70 will cause this stage to reverse its state. This first pulse has no effect on stages 72-80 and hence the output remains at zero volts after one advance pulse. The second advance pulse changes stage 70 back to its original state and changes stage 72 such that the left-hand side becomes positive. Two milliamperes of current will flow from each side of this stage into the two current nodes. Because the left side of stage 70 is negative, current can flow from node 92 to develop a negative two-volt voltage drop across resistor 100. No current will flow from node 86 as diodes 96 and 98 will block it. The next advance pulse will change stage 70 such that the left side is positive but will make no change in stage 72. Current will now flow from node 86, but not from node 92, and a two-volt positive voltage will be developed across resistor 100. The next pair of advance pulses will be effective to change the state of stage 74 to provide minus one and plus one volts at the output. Successive advance pulses cause successive sequentially varying voltages to be developed at the output. With the number of stages shown the final increment between voltages will be one-eighth volt.

The output from the binary stages, which, as shown herein is in voltage form, but could be otherwise, is fed to the discriminator comparator 50 indicated in dotted lines in FIGURE 4. The reference or round-off voltage will be fed to the base of transistor 102 with the output of the integrator circuit 52 being fed to the base of a transistor 104. The emitters of transistors 102 and 104 are connected through a suitable resistor 106 to a positive voltage. The collectors of these transistors are connected through suitable resistors 108 and 110 to a negative voltage. The output of the discriminator may be taken from the collector of transistor 104 with this output running to the "and" gate 54. The type of discriminator and whether or not its output provides a positive or negative voltage may vary. What is important is to provide means for combining in some way, whether by comparison, by addition or subtraction, the voltages or signals from the integrator and from the reference voltage generator. As shown, an operating voltage will be supplied to "and" gate 54 whenever the reference voltage is greater than the input voltage, taking into consideration the sign or polarity of the voltage. A larger reference voltage indicates a subtraction from the accumulating count in that particular channel.

The use, operation and function of the invention are as follows:

This invention provides an accurate and extremely fast method and apparatus for averaging a succession of electrical transients. The average may be either displayed on a conventional oscilloscope, or there may be digital readout. When using a twin beam scope it is possible to display both the average wave form and the input. The number of signals necessary before an accurate average is arrived at will vary depending upon the speed of the signals. The slower or longer the signals, the greater the width of the channels and the greater the number of different reference voltages that are applied during a single channel and hence fewer signals will be necessary to arrive at an accurate average. Shorter or faster signals will require a larger number of signals to arrive at an accurate average.

The particular type of round-off or reference signal may vary. An advantageous sequence of reference signals is illustrated by the circuit shown in FIGURE 4. The reference voltages are arranged in pairs, with the pairs varying in fixed increments of $2^{-n}$ where the value of $n$ is determined by the number of different reference voltages desired. The numbers in each pair have the same arithmetic value, but different polarity. A somewhat similar sequence, again varying in increments of $2^{-n}$ and including both positive and negative voltages, but wherein the voltages are not arranged in pairs of equal arithmetic value, can be easily arranged with binary stages of the type described. In the latter system only one side of the binary stages is used.

Although it has been stated that the reference voltages should have an average midway between the maximum and minimum reference voltages, and this is preferred, it is not always necessary. The reference voltage average may vary by a fixed amount from the midway point, which fixed amount would be taken into consideration and corrected in the final results. It has also been stated that the reference voltage maximums and minimums should be generally the same as the expected maximum and minimum signals at the input. The input signal will have a component formed by the transient of interest and a noise component. The range of reference signals should be the same as the expected range of the transient component. Noise will make the actual value of the input signal, at times, greater than or less than the range of reference signals.

As described, the reference voltage has been compared with the average voltage. The invention should not be limited to comparison of the voltages, as other forms of combination, for example, addition and subtraction, are also satisfactory. The sum or difference between the reference voltage and average voltage can be compared against a given value to determine if a count should be added or subtracted.

In the standard method of operation, a count is added to the accumulating total when the average exceeds the reference signal and a count is subtracted when the reference signal exceeds the average signal. Operation is also satisfactory when the reverse relationship applies, with the resulting wave form being the inverse of the wave form resulting from the standard method of operation.

It is important to be able to divide each channel or address into subintervals and to change the reference voltage applied to the average signal from each subinterval. In this way a number of different reference voltages may be applied to a single transient and the entire range of reference voltages may be applied in a minimum number of transients. This reduces the time that the operator must wait until he has satisfactory data. In some instances, the transient will be of a sufficient duration such that all different reference voltages may be applied to each channel in a single transient. In other cases, where the transient is not as long, a different series of reference voltages will be applied to corresponding channels in successive transients so that, in a minimum number of transients, all different reference voltages will have been utilized. In order to vary the series of reference voltages applied to successive transients, there is no change in reference voltage during a predetermined channel, usually a reference channel.

It is advantageous to have a single time constant for the integrator circuit. This reduces circuitry and makes for stabler operation. The number of subintervals utilized for each channel will depend upon the integration time constant and upon the length of each transient. To provide a separate integrating time constant for each possible selection of interval widths according to the speed of the transient is expensive and there will be calibration problems.

Integration of the transient over a predetermined period is important as it provides an average for the signal over the period in question. If the instantaneous value of the transient were utilized, rather than the average over a predetermined period, considerable information could be lost. It is possible, however, with filtering, to use instantaneous samples of the transient. Components of the transient which would cause a large change in a fraction of a given interval should be filtered and then the instantaneous value of the transient, at any point within the interval, would give a satisfactory representative value of the transient for that interval. Components which would cause a large change in a single interval should not be filtered out.

The particular binary number convention used is very advantageous, although other binary systems may also be satisfactory. The present invention permits the use of an ordinary forward-backward binary scaler which is considerably simpler than an arithmetic circuit of the more conventional type which handles both positive and negative numbers. As described, zero count is represented by the binary number 10000000000000. Plus "1" is represented by 10000000000001 and minus "1" is represented by 01111111111111. In a more conventional binary system, minus "1" would be represented by 00000000000001, where the most significant bit represents the sign of the number.

Various scalers and memory circuits have been utilized in the invention, but have not been described in detail. This equipment may be conventional. It is the particular combination of these units and the manner in which they are utilized which is unique.

Although channels zero and one have been described as being utilized as reference channels, this is not necessary. Any two channels within the total number of channels may be utilized. In some applications it may be advantageous to use channels zero and one and in others it may be advantageous to use the last two channels in the memory.

A highly desirable characteristic of the invention is that the numerical processes involved are very simple. The previously accumulated sum is altered by a single increment depending upon the results of the comparison. The comparison process, and the arithmetic process of altering a number by an increment, may be exceedingly fast, a small fraction of one microsecond even when using ordinary presently available circuit components such as moderately fast transistors. Although the result of a single comparison and count alteration is not numerically significant, the important fact is that this result may be obtained in far less than a millionth of a second, and the apparatus including the comparison circuit is immediately thereafter available for measuring a different interval of the input signal. The relatively uncomplicated circuitry permits extremely fast operation.

Various modes of operation have been described. The invention should not be limited to just these particular modes, nor should the invention be limited to any particular arrangement for applying reference or round-off voltages in a mode of operation.

Whereas the preferred form of the invention has been shown and described herein, it should be realized that there are many modifications, substitutions and alterations thereto within the scope of the following claims.

I claim:

1. In a system for averaging a succession of transients, means for providing a signal representative of the average of each transient over a given time interval, means for providing a plurality of different reference levels varying in generally equal increments between the maximum and minimum expected value of the transients, means for combining each average signal with a reference level to determine whether the average signal is greater or less than the reference level, with successive average signals being combined each with one of said reference levels, a memory device, and means, connected to the memory device and combining means, for changing the accumulating count in the memory device in accordance with whether the average signal was greater or less than the reference level, the accumulated count in the memory device, after a number of transients, representing the average of all transients that have been averaged and combined.

2. The system of claim 1 further characterized in that the means for providing a signal representative of the average of each transient over a given time interval includes an integrating circuit.

3. The system of claim 1 further characterized in that the means for changing the accumulating count in the memory includes means for increasing the count by one when an average signal is greater than its combined reference level, and for decreasing the accumulated count in the memory by one when an average signal is less than its combined reference level.

4. The system of claim 1 further characterized in that the means for providing different reference levels provides reference levels, the average of which is generally midway between the maximum and minimum reference levels.

5. The system of claim 1 further characterized in that the means for providing a plurality of different reference levels includes circuit means for providing a series of output voltages varying in arithmetic value in generally equal increments between a maximum and minimum.

6. The system of claim 5 further characterized in that said circuit means provides output voltages varying in increments of $X^{-n}$ where X is greater than one, and $n$ is an integer.

7. The system of claim 5 further characterized in that said circuit means provides output voltages varying in increments of $2^{-n}$ where $n$ is an integer.

8. The system of claim 5 further characterized in that said circuit means includes a series of bistable stages, and circuit means for providing sequentially varying output currents from said stages.

9. The system of claim 8 further characterized in that said bistable stages each produce positive and negative output currents.

10. In a system for averaging a succession of electrical signal transients, circuit means for dividing each transient into corresponding time intervals, circuit means for providing a plurality of average signals, with each average signal representing the average of a transient for at least a portion of a time interval, circuit means for providing a plurality of different reference levels, circuit means for combining the reference levels and average signals and for providing a resultant signal for each combination of reference level and average signal which resultant signal indicates whether the average signal was greater or less than the reference level, with successive average signals being combined each with one of said reference levels, a memory circuit having a plurality of memory channels, one for each time interval, said dividing circuit means being connected to said memory, and means, connected to the memory device and combining means, for changing the accumulating count in each memory channel in accordance with said resultant signals, the accumulated count in each memory channel after a number of transients representing the average of all transients which have been averaged and combined.

11. The system of claim 10 further characterized in that said memory is binary in form with zero count in each memory channel being represented by approximately one-half the maximum possible count in the memory.

12. The system of claim 11 further characterized by circuit means in the memory for using the most significant binary bit in each count to indicate the sign of the count.

13. The system of claim 11 further characterized by circuit means in the memory for representing zero count in each memory channel by a "1" in the most significant binary bit, with all other binary bits being "0."

14. The system of claim 13 further characterized by circuit means in the memory wherein the addition of a count to zero count changes the least significant binary bit to a "1," the subtraction of a count from zero count reverses the state of all binary bits.

15. The system of claim 10 further characterized by at least one reference channel in said memory for indicating the maximum possible value of the average of the transient amplitudes.

16. The system of claim 15 further characterized in that said memory includes a pair of reference channels, one for indicating the maximum possible positive value of the average of the transient amplitudes and one for indicating the maximum possible negative value of the average of the transient amplitudes.

17. The system of claim 10 further characterized by circuit means for averaging each transient a predetermined number of times in each time interval.

18. The system of claim 10 further characterized by circuit means for averaging each transient a predetermined number of times in each time interval, and circuit means for combining each different reference level being combined with an average signal during a single time interval.

19. The system of claim 10 further characterized by circuit means for averaging each transient a predetermined number of times in each interval, and circuit means for combining different reference levels with the average signals during each time interval.

20. The system of claim 10 further characterized in that said memory is a multibit binary memory, and includes means connected to said memory for selecting a given number of sequential binary bits in the memory channels, less than the total number of bits, and for converting the selected bits into analog form.

21. The system of claim 20 further characterized by circuit means in the memory within zero count in each memory channel is represented by the most significant binary bit being in one state and all other binary bits being in the opposite state.

22. The system of claim 20 further characterized in that said selection and conversion means includes a group of parallel resistors varying sequentially in size by a factor of two, the largest resistor being connected to the least significant bit in a selected group of sequential bits.

23. In a system for averaging a succession of electrical transients at corresponding time intervals, a memory having a memory channel for each time interval, a memory address circuit connected to the memory, an integrator circuit at the input for averaging selected periods of the electrical transients, reference voltage generating means for providing a plurality of different reference voltages, a comparator circuit connected to said integrator and said reference voltage generating means for comparing said reference voltages with the integrator output, with the comparator output indicating whether the reference voltage was greater or less than the integrator output, with successive integrator outputs being compared each with one of said reference voltages, add-subtract circuit means connecting said comparator to said memory for changing the accumulating count in the memory in accordance with the output of said comparator, with the accumulated count in the memory, after a number of transients, representing the average of said transients, and circuit means coordinating the operation of the address circuit, memory, integrator and add-subtract circuit means.

24. The system of claim 23 further characterized in that said add-subtract circuit means includes a bistable stage connected to said comparator, and an arithmetic scaler connected to said memory and the output of said bistable stage.

25. The system of claim 24 further characterized in that said comparator circuit output controls the state of said bistable stage, said stage being in one state when a reference voltage is greater than the integrator output, and being in the opposite state when the integrator output exceeds a reference voltage.

26. The system of claim 25 further characterized in that said arithmetic scaler is connected to said bistable stage in a manner to advance one count when said bistable stage is in one state and to subtract one count when said stage is in the opposite state.

27. The system of claim 23 further characterized in that said coordinating circuit means includes means for supplying a sequence of pulses at fixed intervals.

28. The system of claim 27 further characterized by means for advancing said address circuit in response to said pulses including a frequency divider circuit the input of which receives said pulses, the output of said divider circuit being connected to said address circuit.

29. The system of claim 27 further characterized by a connection between said pulse supplying means and said reference voltage generating means, said pulses being effective to change the output of said reference voltage generating means.

30. The system of claim 23 further characterized by means for providing visual display of the accumulating count in the memory.

31. The system of claim 23 further characterized in that said integrator circuit has a fixed time constant.

32. The system of claim 23 further characterized by and including circuit means for advancing said address $n$ channels at a time, where $n$ is greater than one.

33. The system of claim 32 further characterized in that said address circuit includes two binary scalers, one for the least significant bits in the address, and one for the most significant bits in the address, an oscillator providing a series of spaced pulses at its output, a binary scaler having the same number of bits as in the least significant bit address scaler, and a digital comparator providing an output pulse to the coordinating circuit means whenever the state of said binary scaler and least significant bit address scaler are the same.

34. The system of claim 23 further characterized by and including circuit means controlling the operation of said reference voltage generating means to provide different reference voltages during corresponding time intervals of successive transients.

35. The system of claim 34 further characterized in that said controlling circuit means includes means for advancing said reference voltage generating means to provide a different reference voltage for each integrator output except when said memory and memory address are in a predetermined channel.

36. In a system for averaging a succession of electrical signal transients, circuit means for dividing each transient into corresponding time intervals, circuit means for providing a plurality of signals, with each signal representing a transient for at least a portion of a time interval, circuit means for providing a plurality of different reference levels, circuit means for combining the reference levels and signals and for providing a resultant signal for each combination of reference level and signal which resultant signal indicates whether the signal was greater or less than the reference level, with successive signals being combined each with only one of said reference levels, a memory circuit having a plurality of memory channels, one for each time interval, said dividing circuit means being connected to said memory, and means, connected to the memory device and combining means, for changing the accumulating count in each memory channel in accordance with said resultant signals, the accumulated count in each memory channel after a number of transients representing the average of all transients which have been combined.

References Cited by the Examiner

UNITED STATES PATENTS

| | | | |
|---|---|---|---|
| 2,836,356 | 5/58 | Forrest et al. | 324—99 |
| 2,840,707 | 6/58 | Johnson | 328—151 |
| 2,877,413 | 3/59 | Muehler | 340—347 |
| 2,950,052 | 8/60 | Knox | 235—154 |
| 2,967,292 | 1/61 | Eisner | 340—347 |
| 3,079,084 | 2/63 | Briney et al. | 235—154 |
| 3,105,231 | 9/63 | Gordon et al. | 340—347 |

MALCOLM A. MORRISON, *Primary Examiner.*